A. L. HARVEY.
MOTOR CONTROL SYSTEM.
APPLICATION FILED NOV. 4, 1918.
1,414,408.
Patented May 2, 1922.
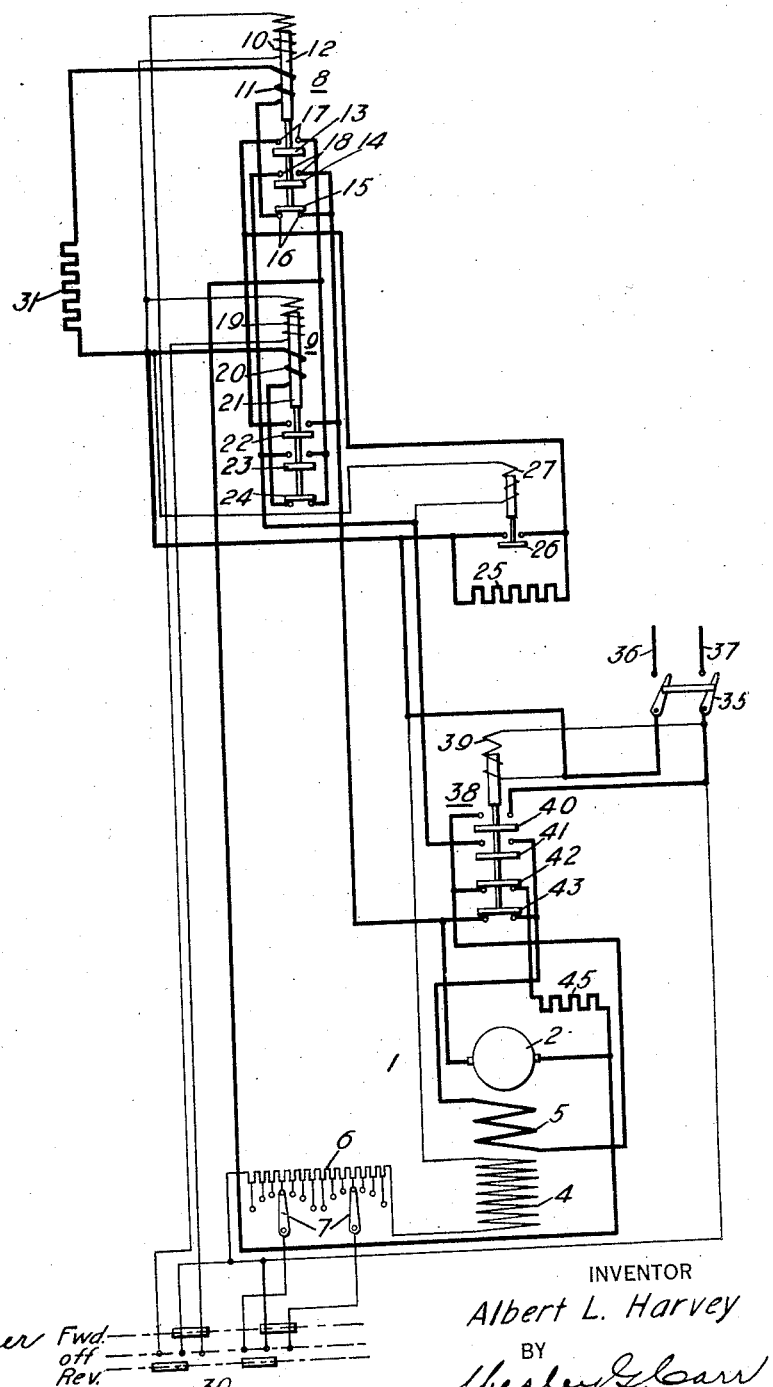
WITNESSES:
H. J. Shelhamer
David Rines
INVENTOR
Albert L. Harvey
BY
Wesley G. Carr
ATTORNEY

UNITED STATES PATENT OFFICE.

ALBERT L. HARVEY, OF BRADDOCK TOWNSHIP, ALLEGHENY COUNTY, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

1,414,408. Specification of Letters Patent. Patented May 2, 1922.

Application filed November 4, 1918. Serial No. 260,953.

*To all whom it may concern:*

Be it known that I, ALBERT L. HARVEY, a citizen of the United States, and a resident of Braddock township, in the county of Allegheny and State of Pennsylvania, have invented a new and useful Improvement in Motor-Control Systems, of which the following is a specification.

My invention relates to systems of control and particularly to systems for governing the operation of planers or machines which have similar cycles of operation.

In control systems of the above-indicated character, it has been customary to utilize the shunt field-magnet winding or the residual magnetism in the motor for maintaining the motor field energized during dynamic braking, upon a failure of voltage. When the voltage fails, the shunt field-magnet winding becomes de-energized and dynamic braking is, therefore, then unavailable.

One object of my invention is to provide a control system of the above-indicated character with the use of which it shall be possible to effect dynamic braking at all times.

Another object is to provide a control system individual features of which shall be of general application.

In a co-pending application by Adolph A. Gazda, Serial No. 206,140, filed December 8, 1917, and assigned to the Westinghouse Electric & Manufacturing Co., it is shown how the difficulty above referred to may be overcome by providing the motor with a series field-magnet winding that is divided into two equal portions which are wound in opposite directions, the one or the other portion being employed, according to the direction of rotation of the motor, for normal operation, and the de-energized portion being utilized for establishing a field for the motor during dynamic braking, upon failure of voltage. This solution of the problem, while entirely satisfactory in operation, is open to the objection that a specially-wound motor is required.

My invention may be employed in connection with motors of the standard type; the control system alone is modified. The additional apparatus required is a single switch and a suitably-designed resistor, the switch being normally closed to connect the motor to the line. Upon failure of voltage, the switch is opened to break the connection to the line, and a local circuit is established for the armature, the series field-magnet winding and the above-named additional resistor. The direction of current flow in the series winding is thereby reversed and the motor is operated as a series generator to effect dynamic braking.

The single figure of the accompanying drawing is a diagrammatic view of circuits and apparatus arranged according to my invention.

The motor 1 is provided with an armature 2, a shunt field-magnet winding 4 and a series field-magnet winding 5. A resistor 6 is provided in the circuit of the shunt field-magnet winding 4, the effective resistance of which may be varied by controller arms 7.

Switch mechanisms 8 and 9 control the direction of rotation of the motor. The switch mechanism 8 embodies two coils 10 and 11, the former of which is adapted to actuate a core 12 in opposition to the force of gravity and the latter of which is designed to maintain the core 12 in the position to which it is returned by gravity. The core 12 is provided with three switch members 13, 14 and 15. The switch member 15 is adapted to bridge contact terminals 16 when the core 12 is in its released or lower position, and the switch members 13 and 14 are respectively adapted to bridge contact members 17 and 18 when the core 12 is in its operative or upper position. The switch mechanism 9 embodies two coils 19 and 20 respectively performing functions similar to those of the coils 10 and 11, a core 21, and three switch members 22, 23 and 24. The switch member 24 is adapted to complete a circuit when the core 21 is in its released position, and the switch members 22 and 23 are adapted to complete circuits when the core 21 is in its operative position.

A resistor 25, in series with the armature 2, is controlled by a switch 26 in accordance with the degree of energization of a counter-electromotive-force coil 27. A controller, diagrammatically illustrated at 30, is adapted to be automatically actuated to forward and to reverse position upon the completion, respectively, of the reverse and the forward stroke of the planer platen. A resistor 31 is adapted to be connected in a dynamic braking circuit, including the armature 2 and the switch members 15 and 24. A two-pole switch 35 is provided for connecting the control system to the supply conductors 36 and 37.

In addition to the above-described elements, I provide a switch mechanism 38 to be actuated by a coil 39, which is connected to the line conductors 36 and 37, through the two-pole switch 35, to close switch members 40 and 41 which connect the motor 1 to the line. Upon failure of voltage, or, when the coil 39 is in any other way de-energized, switch members 42 and 43, mechanically connected to the switch members 40 and 41, close a dynamic braking circuit, including the armature 2, series field-magnet winding 5 and a properly designed resistor 45.

Assuming the system to be in the position illustrated in the drawing, the switch 35 may be closed to complete the circuits of the motor. If the planer table happens to be at the end of its return stroke, the controller 30 will be actuated thereby to forward position, thereby closing a circuit which extends from the line conductor 37, through the switch 35, the controller 30, the actuating coil 19, and the switch 35, to the line conductor 36. The core 21 is thereupon actuated to close the switch members 22 and 23.

Upon the closing of the switch 35, the coil 39 is also energized to close the switch members 40 and 41, and the shunt field-magnet winding 4 is energized by the closing of a circuit extending from the line conductor 37 through the switch 35, the right-hand controller arm 7, a portion of the resistor 6, the shunt field-magnet winding 4, and the switch 35 to the line conductor 36. The armature circuit may be traced from the line conductor 37, through the switch 35, the switch 40, series field-magnet winding 5, the switch 41, the switch 23, the armature 2, the switch 22, the resistor 25 and the switch 35 to the line conductor 36. The circuit for the counter-electromotive-force coil 27 is as follows: from one terminal of the armature 2, through the switch 15, the coil 11, the dynamic-braking resistor 31, the coil 27, and the switch 23, to the other terminal of the armature 2. When the counter-electromotive force of the motor reaches a sufficiently high value, the switch 26 will be closed by the coil 27 to short-circuit the resistor 25, and thereby bring the motor 1 to high speed.

When the planer table has reached the end of the forward or cutting stroke, the controller 30 will be automatically operated to the reverse position, thereby de-energizing the coil 19 and energizing the coil 10; also to complete the circuit of the shunt field-magnet winding 4, through the left-hand controller arm 7. Before the motor can start in the reverse direction, however, a dynamic-braking circuit for the motor will be completed from one terminal of the armature 2 through the switch 15, the coil 11, the resistor 31, the coil 20 and the switch 24 to the other terminal of the armature 2.

As soon as the current flowing in this circuit falls to a sufficiently low value, the coil 10 will actuate the switch members 13 and 14 to closed positions to complete a circuit for operating the motor in the reverse direction. The circuit of the coil 10 is from the line conductor 37, through the switch 35, the controller 30, which now occupies the reverse position, the coil 10 and the switch 35 to the line conductor 36. The armature circuit is from the switch 41, which is connected to the line conductor 37 by way of the series field magnet-winding 5, as described above in connection with the forward operation of the motor, through the switch member 14, the armature 2, in the reverse direction, the switch 13, the resistor 25 and the switch 35, to the line conductor 36. The counter-electromotive force coil 27 is energized by a circuit extending from one terminal of the armature 2, through the switch 14, the coil 27, the coil 20 and the switch 24, to the other terminal of the armature 2. As before described, the switch 26 will close when the motor has reached a predetermined speed and has developed sufficient counter-electromotive force to short-circuit the resistor 25 and thereby further accelerate the motor. The circuit of the shunt field-magnet winding 4 is the same as before described, except that it runs through the left-hand conroller arm 7, so as to include a greater portion of the resistor 7. When the planer table has reached the end of the return stroke, the controller 30 will again be operated to the forward position to complete the motor circuits for operation in the forward direction. Before this is accomplished, however, the above-described dynamic-braking circuit will again be completed as soon as the switch member 15 makes contact with the contact members 16, upon the de-energization of the coil 10.

On the forward stroke, the motor speed is slow, as compared with that on the return stroke, because the shunt field is more strongly energized, due to a smaller portion of the resistor 6 being in circuit with the shunt field-magnet winding 4 during the forward operation of the motor. The speed on the forward stroke is only one-third or one-half as great as during the return stroke. It is especially during the return at high speed that provision should be made for dynamically braking the motor because the energy in the armature and moving parts is, particularly at that time, great enough to cause damage unless the parts are reliably stopped. It is desirable, too, that dynamic-braking means be supplied for slowing up the motor at other times as well. If the nature of the work is such that a failure of braking action during the return stroke will do no damage, while such failure on the cutting stroke may cause damage, as when working up to a shoulder, the apparatus described may be made to provide emergency braking by reversing the connections between the armature and the series-field winding, so that it will be effective, in regard to regenerative action, in the opposite direction of rotation. Upon failure of voltage, the shunt field-magnet winding 4, the circuit of which is specified above, becomes de-energized. The dynamic-braking circuit, including the resistor 31, is then ineffective to dynamically brake the motor. According to my invention, however, upon failure of voltage, the coil 39 becomes de-energized, causing the closing of the switch members 42 and 43, which establish an additional dynamic-braking circuit which extends from one terminal of the armature 2 through the switch 43, the series field-magnet winding 5, the switch 42 and the resistor 45, to the other terminal of the armature 2. The armature 2, continuing to rotate, causes current to flow through the series field-magnet winding 5 in a direction opposite to that which flows during the normal operation of the motor. The motor thus operates, as a series generator, which operation, independently of the resistor 31 and contactors 8 and 9, results in dynamically braking the motor.

The additional, suitably designed resistor 45 is necessary because it has been found that, if the same resistor 31 be relied upon for emergency braking, the result is not satisfactory, inasmuch as the resistor 31 has too high an ohmic value to permit satisfactory operation during failure of voltage. The operation of the motor is that of a series generator, and the value of the resistor must be below the point that will permit the machine to build up its voltage as a series generator. On some particular machines, the ohmic value necessary to obtain the desired characteristics may be supplied by the connections between the armature and the contactor 38.

From the above description, it will be noted that, during normal operation of the motor 1, when the motor is excited by means of the shunt field-magnet winding 4, the dynamic braking circuit, including the resistor 31, serves very satisfactorily. Upon failure of voltage, however, when the shunt field-magnet winding 4 becomes de-energized, the motor is dynamically brought to a stop by a dynamic-braking circuit which comprises the series field-magnet winding 5 and the resistor 45, the motor then acting as a series generator.

Modifications in the system and in the arrangement and location of parts may be made within the spirit and scope of my invention, and such modifications are intended to be covered by the appended claims.

I claim as my invention:

1. The combination with an electric motor having an armature, a series field-magnet winding, a shunt field-magnet winding, and a dynamic-braking resistor, of means for connecting said armature in circuit with said resistor to effect dynamic braking when said shunt field-magnet winding is energized, and means for connecting said armature and said series field-magnet winding in a local circuit to effect dynamic-braking when said shunt field-magnet winding is not energized.

2. The combination with an electric motor having an armature and accelerating and dynamic-braking resistors, a switch for short-circuiting said accelerating resistor and having an actuating coil, and a pair of reversing switches for said motor, of a switch mechanically connected to each of said reversing switches, each of said mechanically-connected switches controlling a circuit comprising said coil, said armature and the other of said reversing switches and a second circuit comprising said armature, said dynamic-braking resistor and the other mechanically-connected switch.

3. The combination with an electric motor having an armature and a resistor in series therewith, a switch for short-circuiting said resistor and having an actuating coil, and a pair of reversing switches for said motor and each having a switch mechanically connected thereto, of means for connecting said coil in circuit with said armature, one of said reversing switches, and the switch mechanically connected to said other reversing switch.

4. The combination with an electric motor, a dynamic-braking resistor, an accelerating switch having an actuating coil and a pair of reversing switches, of a switch interlocked with each of said reversing switches, said interlocked switches being operable, when only one of them is closed, to complete a circuit comprising said coil, one of said reversing switches and the armature of said motor, and, when both of said switches are closed, to complete a circuit comprising said armature and said resistor.

5. The combination with an electric motor, having a series field-magnet winding, and a plurality of dynamic-braking resistors, of means for connecting one of said resistors in circuit with the armature only of said motor for dynamic braking under normal conditions and for connecting the other of said resistors in circuit with said field-magnet winding and said armature for dynamic braking under emergency conditions.

In testimony whereof, I have hereunto subscribed my name this 28th day of Oct., 1918.

ALBERT L. HARVEY.